United States Patent Office 3,238,155
Patented Mar. 1, 1966

3,238,155
ADDITION OF MELAMINE-FORMALDEHYDE TO MAGNESIUM OXYCEMENT TO IMPROVE THE RESISTANCE TO THE PASSAGE OF WATER OF SAID CEMENT
Bob R. Harrell, Hershel B. Prindle, and Stephen P. Edwards, Lake Jackson, Tex., assignors to The Dow Chemical Company, Midland, Mich., a corporation of Delaware
No Drawing. Filed Dec. 4, 1961, Ser. No. 156,985
3 Claims. (Cl. 260—2.5)

This invention pertains to an improved magnesium oxycement formulation and a process for its preparation.

Magnesium oxychloride and magnesium oxysulfate cements are wel known and are widely used as a construction material. While there are many advantages for using these cements, their utility in places of high moisture content or for exterior uses has been greatly limited by its poor water resistance.

It is therefore an object of this invention to provide an improved composition and a method for its preparation which will have improved water resistance.

The above and other objects are attained according to the invention by the addition of from 0.05 to 2.0 weight percent of a resinous polymeric composition of melamine-formaldehyde. By the incorporation of the resin in the cement the water resistance of the cement is considerably increased. When the material is submerged in water the material will take up only about 18 pounds of water per cubic foot as compared to over 27 pounds normally taken up by the cement not containing the additament.

In the preparation of conventional magnesium oxychloride or magnesium oxysulfate cement, generally a solution of the magnesium chloride or magnesium sulfate or mixtures of the two are intermixed with magnesium oxide in a ratio of the magnesium oxide to the magnesium salt of at least 0.8 to 1 and the mixture allowed to set. If it is desirable to obtain a foamed product, a foaming agent may be added to the mixture and the mixture foamed prior to setting. While the melamine resin may be added any time in accordance with the invention to the conventional cement constituents prior to setting, it is preferred generally to disperse the melamine resin in a limited amount of water or alcohol and intermix the dispersion with the magnesium oxide slurry prior to its reaction with the magnesium chloride or magnesium sulfate. It is essential only that the resin be uniformly dispersed throughout the cement prior to setting so that any of the various known methods of preparing the magnesium oxycement may be used to make the improved product.

Only a small amount of resin need be added. Considerable improvement may be obtained with the addition of approximately 0.05 weight percent of the resin to the oxycement. An amount over 2 percent is seldom used. It is preferred to use from 0.5 to 1.0 percent of the resin. In the preferred range optimum water resistance is obtained which does not improve appreciably with additional amounts of the additament.

The melamine resins which may be used are the melamine formaldehyde resinous polymeric compositions having a ratio of melamine to formaldehyde in the range of 1:2 to 1:6, preferably in the range of 1:2 to 1:3.

To further illustrate the invention a magnesium oxycement was prepared containing the melamine resin and the water pick-up of the cement containing the additament was compared to a product prepared in a similar manner with the exception that the additament was omitted.

In the preparation of the oxycement for the purpose of this illustration, a solution of 34 weight percent magnesium chloride and 19 weight percent magnesium sulfate were intermixed and magnesium oxide was then intermixed with these two solutions in a proportion such that a mixture containing 33 percent magnesium oxide, 13.6 magnesium chloride, 4 percent magnesium sulfate, and about 1 weight percent melamine resin was obtained, the remainder being water. The melamine resin was dispersed in a small amount of water and added to the magnesium oxide slurry prior to the addition of the magnesium salt solutions. To this mixture 0.7 percent of a foaming agent was added and the product was foamed by passing the above mixture through a foaming apparatus similar to that described in the copending application, Serial No. 156,652, filed December 4, 1961. The product obtained was allowed to set for 24 hours and then subjected to the water pick-up test by submerging the product in water for a period of 48 hours and noting the increase in weight. In a controlled sample the resin was omitted but the process for the preparation was the same as that described above. The foamed products obtained had a density of about 10 pounds per cubic foot.

In making the water resistance test, the foams obtained by the process described above were cut into rectangular pieces three inches by thre inches by one and one-half inches thick. These pieces were weighed to determine the starting density then submerged in water in shallow pans. The water level was maintained at a height which kept the samples completely covered. At selected time intervals, the samples were removed from their pans, allowed to drain on a paper towel, weighed and immediately placed back into the water. On this basis, it was calculated that the control sample without the additament after 48 hours of submergence picked up 27 pounds of water per cubic foot, while with the addition of resin the water picked up amounted to 18 pounds per cubic foot.

Similar results were obtained when the amount of resin was varied from .05 to 2 weight percent.

What is claimed is:

1. In a magnesia cement product comprising the reaction product of magnesium oxide and a magnesium salt in aqueous solution in proportions of each which set to a hard solid, said salt being selected from the group consisting of magnesium chloride and magnesium sulfate, the improvement consisting of the incorporation therein, to increase the resistance to the passage of water of the cement when set, of between about 0.05% and about 2.0%, based upon the combined weights of the magnesium oxide and magnesium salt present, of a resinous polymeric composition prepared by polymerizing a reaction mixture of formaldehyde and melamine in a ratio of between 2 and 6 moles of formaldehyde per mole of melamine.

2. The method of increasing the resistance to the passage of water through set magnesium oxysulfate cement and magnesium oxychloride cement which consists essentially of admixing, with magnesium oxide, water, and a magnesium salt selected from the class consisting of magnesium sulfate and magnesium chloride, in proportions of each which set to a hard solid, between about 0.05% and about 2.0%, by weight of the combined weights of the magnesium oxide and magnesium salt present, of a resinous polymer prepared by polymerizing formaldehyde and melamine in a ratio of between 2 and 6 moles of formaldehyde per mole of melamine and causing the resulting mixture to stand for a time sufficient for it to set to a solid.

3. The method according to claim 2 wherein a foaming agent is admixed with the magnesium oxide, water, magnesium salt, and resinous polymer prior to the set of the mixture.

References Cited by the Examiner

UNITED STATES PATENTS

| | | | |
|---|---|---|---|
| 1,283,546 | 11/1918 | Olsen | 106—107 |
| 2,432,971 | 12/1947 | Ruthman et al. | 260—2.5 |
| 2,652,374 | 9/1953 | Thompson | 260—29.4 |
| 2,944,921 | 7/1960 | Groves et al. | 260—29.4 |
| 2,993,016 | 7/1961 | Sucetti | 260—29.4 |
| 3,130,174 | 4/1964 | Floyd et al. | 260—2.5 |

FOREIGN PATENTS 742,803   1/1956   Great Britain.

MURRAY TILLMAN, *Primary Examiner.*

LEON J. BERCOVITZ, *Examiner.*